United States Patent
Samuels et al.

(10) Patent No.: US 9,910,342 B2
(45) Date of Patent: Mar. 6, 2018

(54) CAMERA HEAT SINK

(71) Applicant: GoPro, Inc., San Mateo, CA (US)

(72) Inventors: Rudy Lucas Samuels, Mill Valley, CA (US); Scott Patrick Campbell, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/219,569

(22) Filed: Jul. 26, 2016

(65) Prior Publication Data

US 2016/0334692 A1    Nov. 17, 2016

Related U.S. Application Data

(62) Division of application No. 14/458,195, filed on Aug. 12, 2014, now Pat. No. 9,432,561.

(60) Provisional application No. 61/865,599, filed on Aug. 13, 2013.

(51) Int. Cl.
*H04N 5/225* (2006.01)
*G03B 17/56* (2006.01)
*G03B 17/55* (2006.01)

(52) U.S. Cl.
CPC ........... *G03B 17/55* (2013.01); *G03B 17/568* (2013.01); *H04N 5/2252* (2013.01); *H04N 5/2253* (2013.01); *H04N 5/2254* (2013.01); *G03B 2217/002* (2013.01)

(58) Field of Classification Search
None
See application file for complete search history.

(56) References Cited

U.S. PATENT DOCUMENTS

| | | | |
|---|---|---|---|
| 5,864,365 A | 1/1999 | Sramek et al. |
| 5,978,221 A | 11/1999 | Sawa et al. |
| 7,329,869 B2 | 2/2008 | Cassel et al. |
| 8,199,251 B2 | 6/2012 | Woodman |
| 2006/0285226 A1 | 12/2006 | Senba et al. |
| 2009/0322937 A1 | 12/2009 | Young et al. |

(Continued)

FOREIGN PATENT DOCUMENTS

| | | |
|---|---|---|
| CN | 102692790 A | 9/2012 |
| JP | 2003-161994 A | 6/2003 |
| JP | 2012-047887 A | 3/2012 |

OTHER PUBLICATIONS

European Extended Search Report, European Application No. 13783826.4, dated Oct. 23, 2014, 8 pages.

(Continued)

*Primary Examiner* — Mark T Monk
(74) *Attorney, Agent, or Firm* — Fenwick & West LLP

(57) ABSTRACT

A camera includes a camera body having a camera lens structured on a front surface of the camera body and electronics internal to the camera body for capturing images via the camera lens. A thermally conductive material is thermally coupled to the electronics and exposed on an external face of the camera body. The thermally conductive material transfers heat produced by the electronics to the external face of the camera, and a removable heat sink removably couples to the thermally conductive material. The camera further includes a housing structured to at least partially enclose the camera body. The housing is structured to enable at least a portion of the removable heat sink to protrude through the housing.

20 Claims, 18 Drawing Sheets

(56) References Cited

U.S. PATENT DOCUMENTS

| | | |
|---|---|---|
| 2010/0060747 A1 | 3/2010 | Woodman |
| 2011/0013395 A1* | 1/2011 | Melzner .................. F21S 2/005 362/240 |
| 2013/0107111 A1 | 5/2013 | Campbell et al. |

OTHER PUBLICATIONS

PCT International Search Report and Written Opinion for PCT/US2013/064884, dated Mar. 10, 2014, 11 pages.
United States Office Action, U.S. Appl. No. 14/458,195, dated Feb. 18, 2016, 13 pages.

* cited by examiner

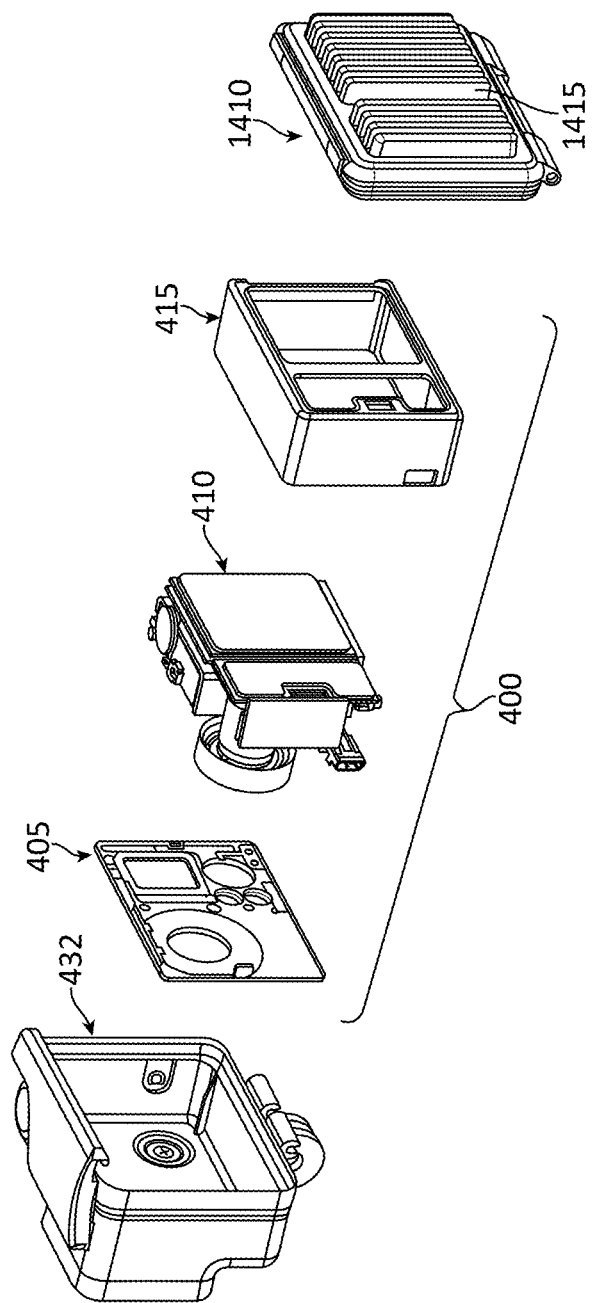

CAMERA HEAT SINK

CROSS-REFERENCE TO RELATED APPLICATIONS

This application is a divisional of U.S. patent application Ser. No. 14/458,195 filed on Aug. 12, 2014, now U.S. Pat. No. 9,432,561, which claims the benefit of U.S. Provisional Patent Application No. 61/865,599, filed Aug. 13, 2013, which is incorporated herein by reference in its entirety.

BACKGROUND

Technical Field

This disclosure relates generally to a camera system, and more specifically to a heat sink for a camera system.

Description of the Related Art

Digital cameras are becoming faster and more powerful. As their capabilities improve, the processing power consumed to enable the faster speeds and greater resolution of modern digital cameras has increased significantly. When a digital camera is used over a long period of time, such as while capturing a video, the temperature of the electronics increases as a portion of the electrical energy is converted to thermal energy by resistive heating. In order to prevent damage to the electronics caused by high temperatures, it is beneficial to dissipate heat from the electronics. However, existing camera systems do not provide an efficient mechanism for heat dissipation. Furthermore, if the camera is placed inside of a closed protective case or waterproof housing, the housing may insulate the camera and restrict heat dissipation, thus increasing the likelihood of overheating.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure 12A:
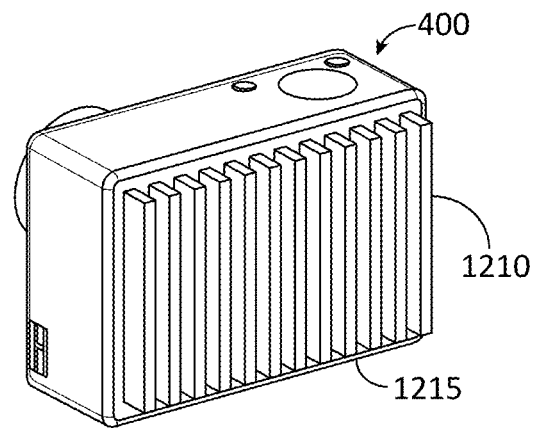
Figure 12B:
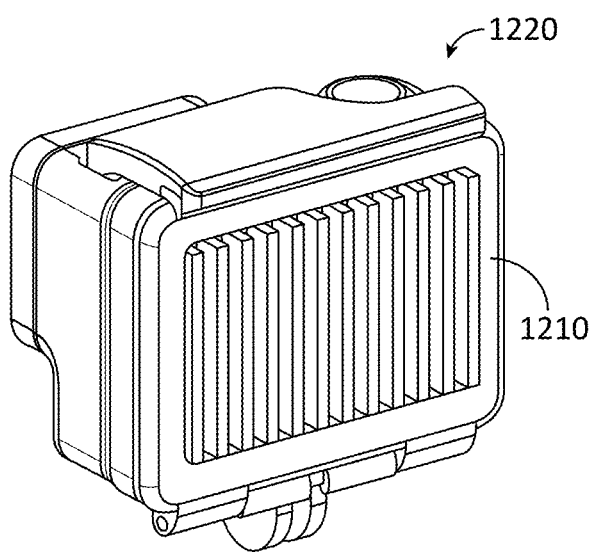

FIGS. 12A-B illustrates a heat sink permanently coupled to a back face of a camera, according to one embodiment.

Figure 13:
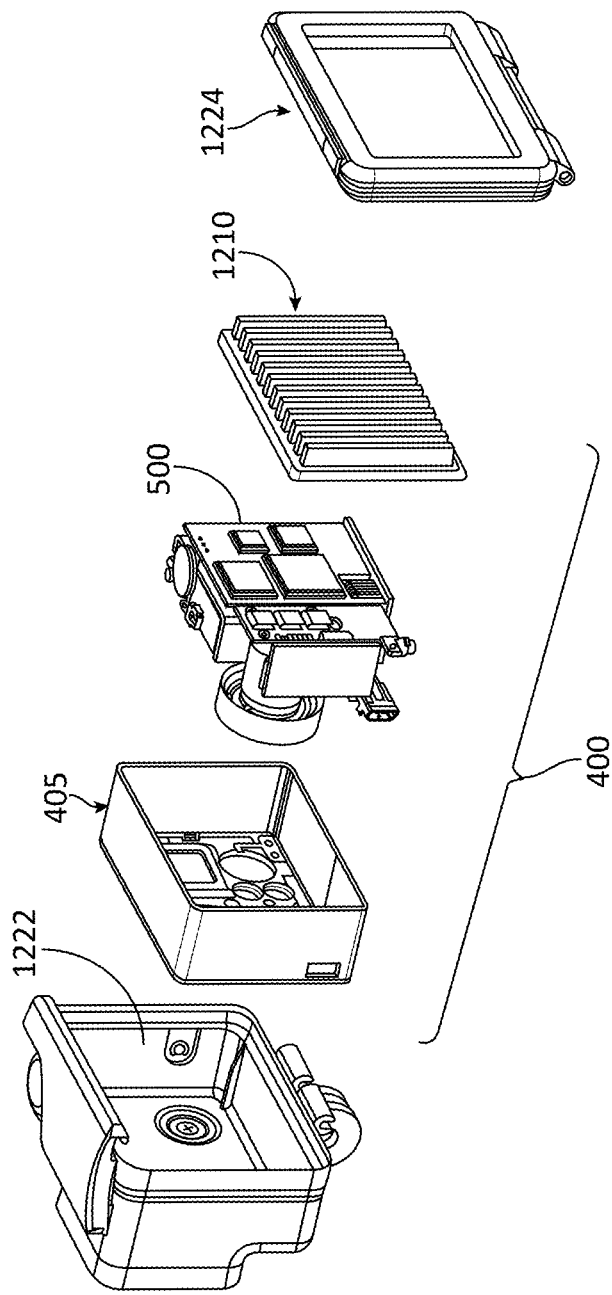

FIG. 13 is an exploded view of a camera system including a heat sink integrated with a back face of a camera, according to one embodiment.

Figure 14A:
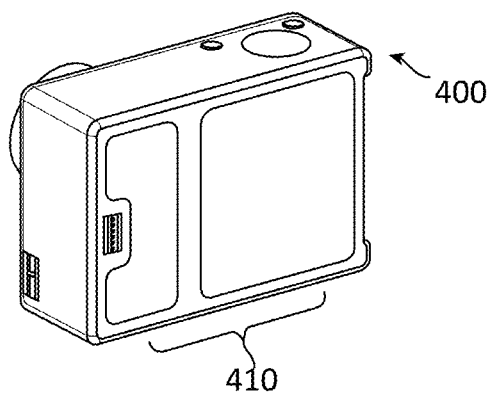
Figure 14B:
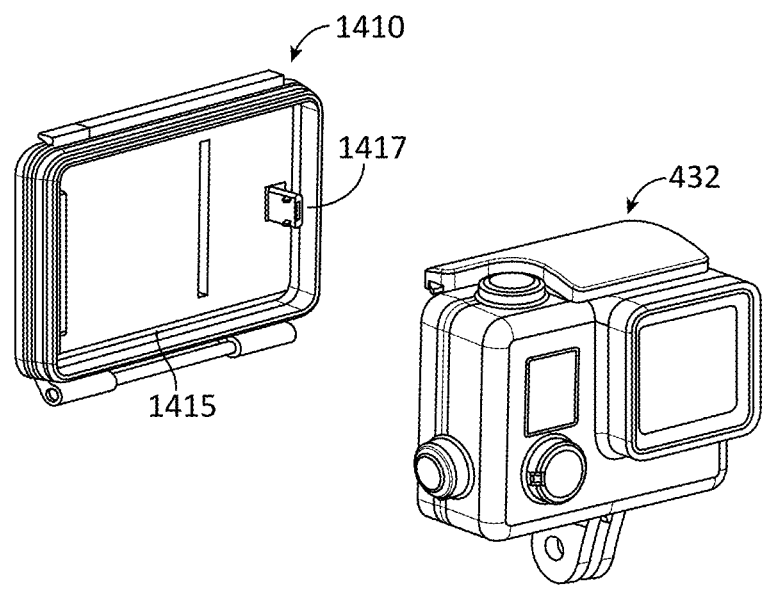

FIGS. 14A-B illustrate a heat sink permanently coupled to a back housing portion, according to one embodiment.

Figure 15:
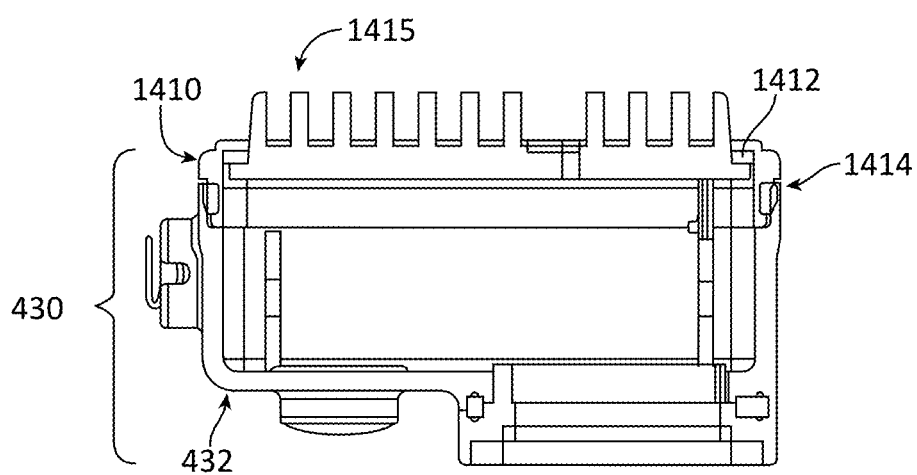

FIG. 15 illustrates a cross-sectional view of a camera housing including a heat sink permanently coupled to a back housing portion, according to one embodiment.

FIG. 16 is an exploded view of a camera system including a heat sink permanently coupled to a back housing portion of a camera housing, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Configuration Overview

A camera system comprises a camera body having a camera lens structured on a front surface of the camera body and electronics (e.g., imaging electronics, power electronics, etc.) internal to the camera body for capturing images via the camera lens and/or performing other functions. In one embodiment, the camera system further comprises a thermally conductive material thermally coupled to the electronics and exposed on an external face of the camera body for dissipating heat produced by the electronics. A heat sink removably couples to the thermally conductive material to further dissipate the heat produced by the electronics. A housing is structured to at least partially enclose the camera body and to enable at least a portion of the removable heat sink to protrude through the housing.

In another embodiment of the camera system, a heat sink is fixedly attached to the camera body. The heat sink is thermally coupled to the electronics of the camera and exposed on an external face of the camera body to dissipate heat produced by the electronics. A housing is structured to at least partially enclose the camera body and to enable at least a portion of the heat sink to protrude through the housing.

In yet another embodiment, a camera comprises a thermally conductive material coupled to electronics of the camera and exposed on an external face of the camera body. A housing comprises a front portion and a back portion, where the front portion is structured to receive the camera body and the back portion is structured to detachably couple to the front portion to at least partially enclose the camera body. The back portion of the housing comprises a heat sink. The heat sink makes contact with the thermally conductive material when the camera body is enclosed in the housing, providing a thermal conduction path from the thermally conductive material to an exterior of the housing.

Example Camera System Configuration

Figure 1A:
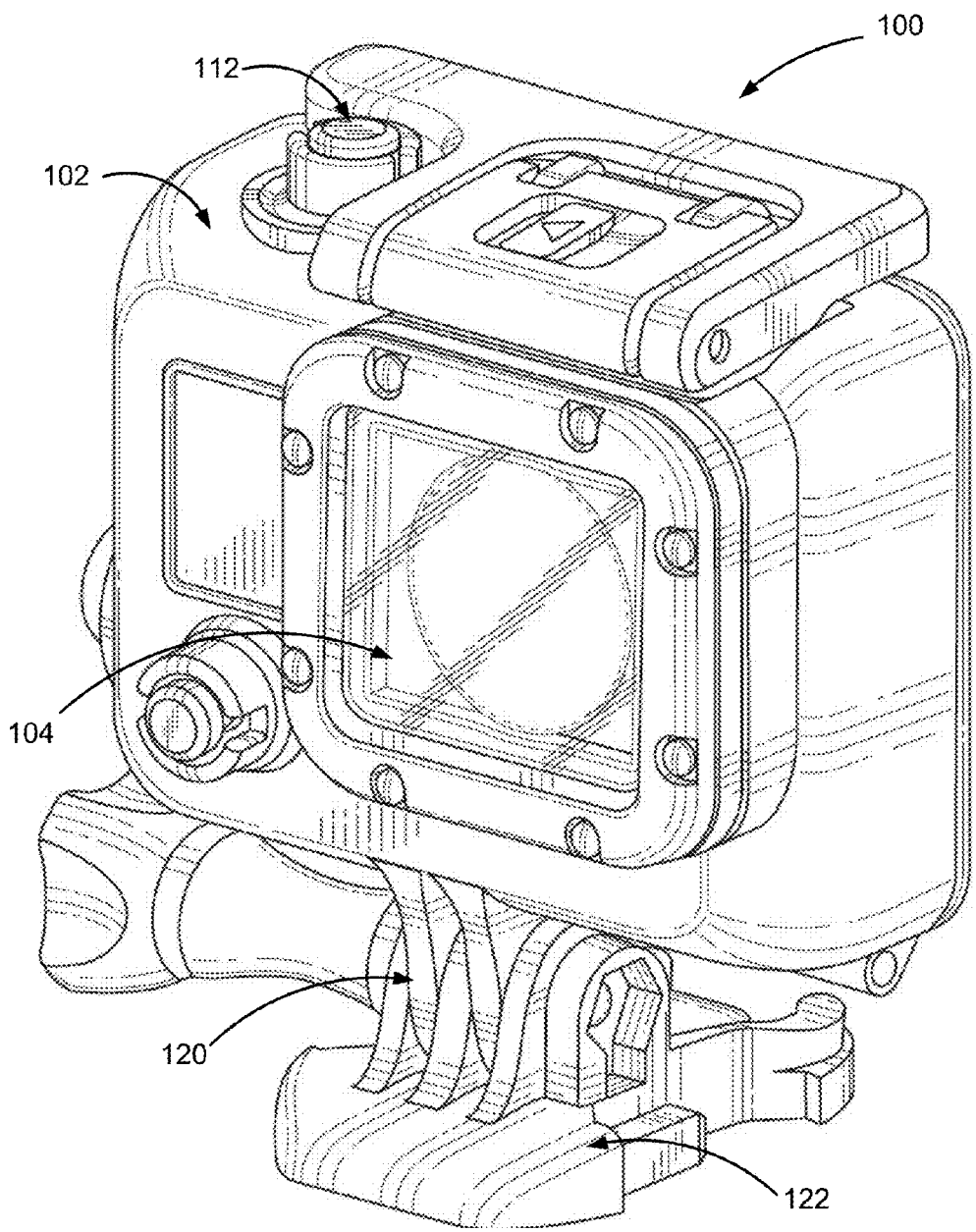
FIG. 1A illustrates a perspective view of a camera system, according to one embodiment.
Figure 1B:
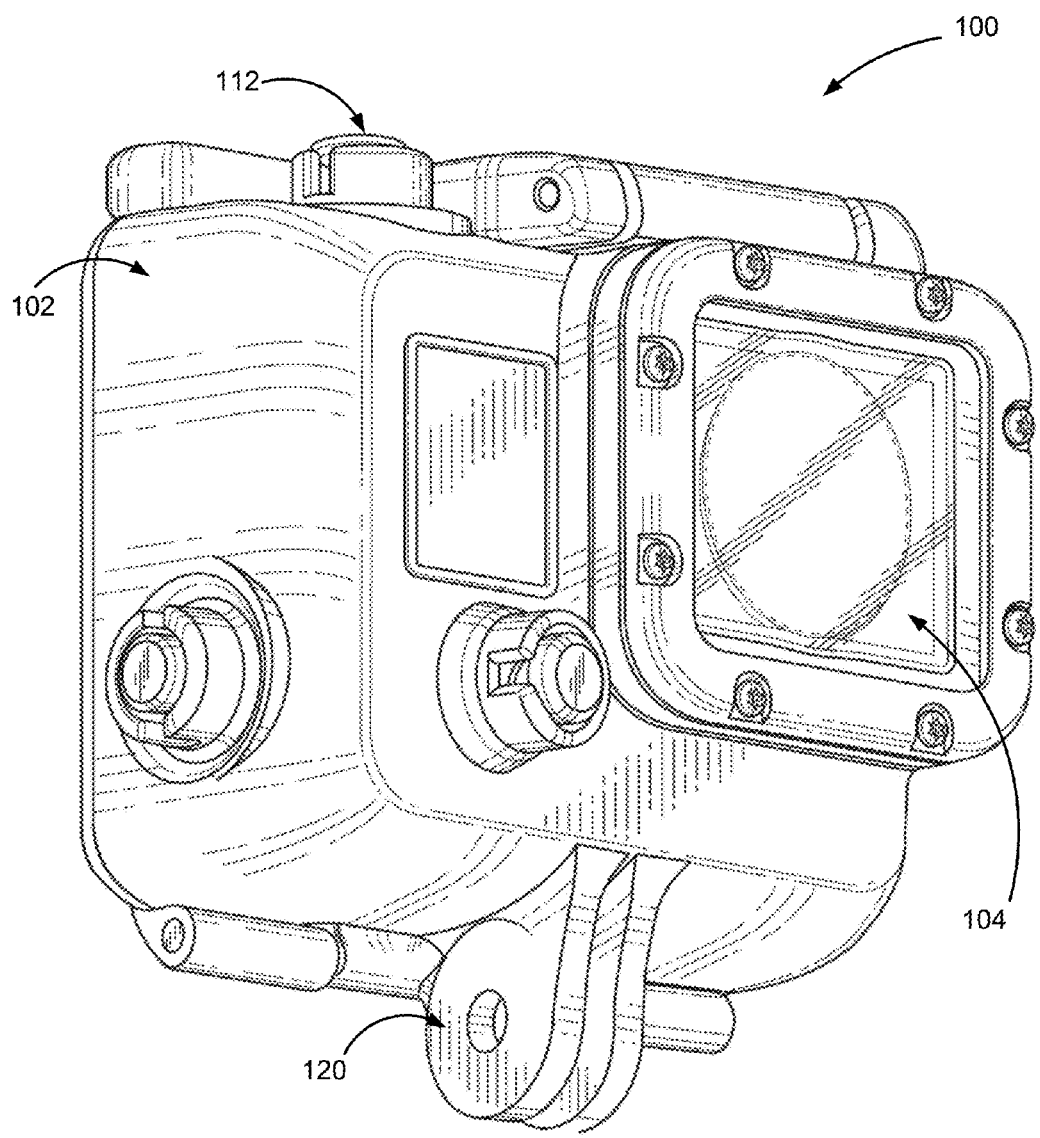
FIG. 1B illustrates an alternative perspective view of a camera system, according to one embodiment.
Figure 2:
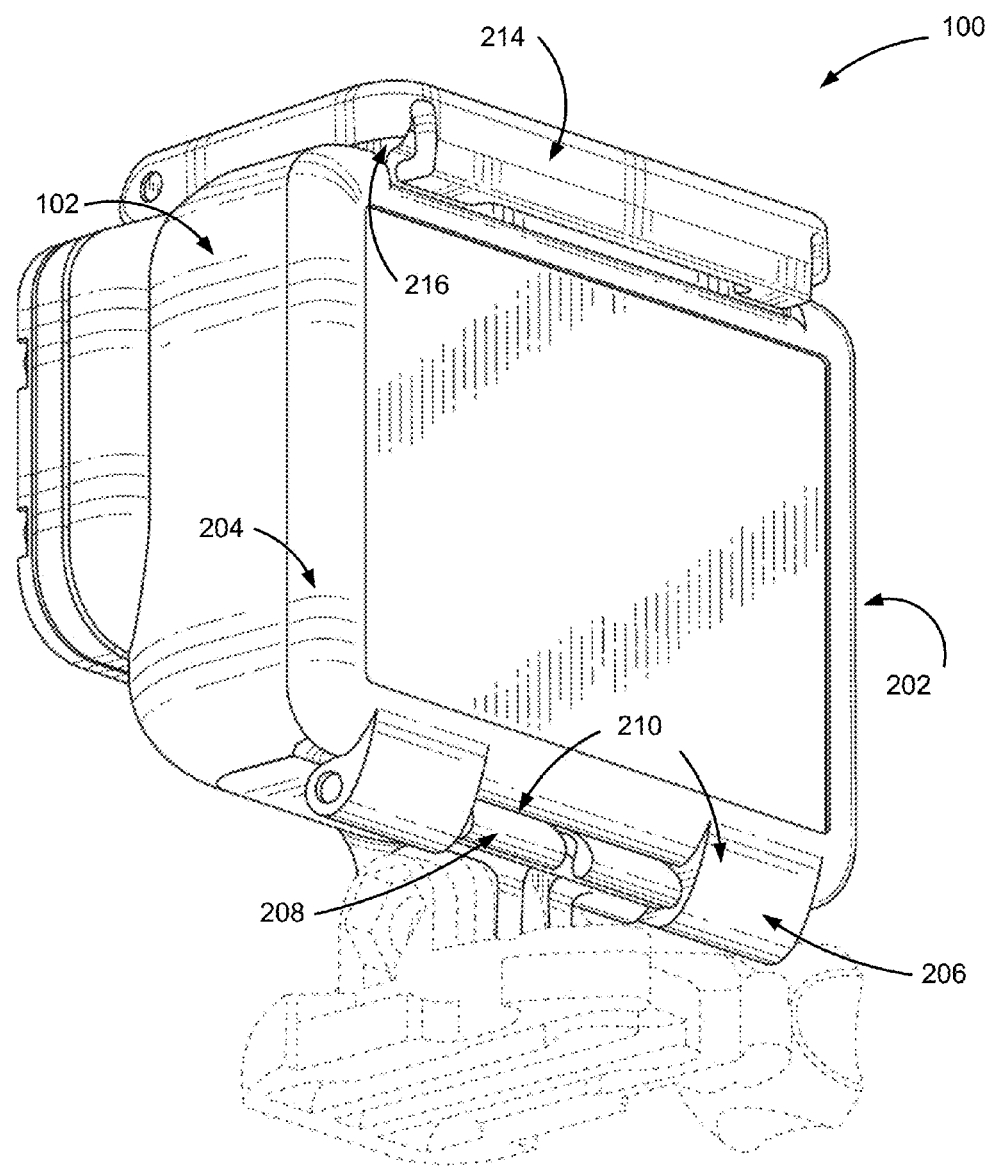
FIG. 2 illustrates a perspective view of a rear of the camera system, according to one embodiment.

A camera system includes a camera and a camera housing for enclosing the camera. FIGS. 1A-B illustrate various views of the camera system in accordance with one embodiment. The camera system includes, among other components, a camera housing 100. In one embodiment, a first housing portion 102 includes a front face with four sides (i.e., a top side, bottom side, left side, and right side) structured to form a cavity that receives a camera (e.g., a still camera or video camera).

In one embodiment, the camera housing 100 has a small form factor (e.g., a height of approximately 4 to 6 centimeters, a width of approximately 5 to 7 centimeters, and a depth of approximately 2 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button of the camera is substantially aligned with the outer shutter button when the camera is secured within the camera housing 100. The shutter button of the camera is operationally coupled to the outer shutter button 112 so that pressing the outer shutter button 112 allows the user to operate the camera shutter button. In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens. In this embodiment, the lens window 104 comprises a waterproof seal so as to maintain the waterproof aspect of the housing 100.

In one embodiment, the camera housing 100 includes one or more securing structures 120 for securing the camera housing 100 to one of a variety of mounting devices. For example, FIG. 1A illustrates the camera housing secured to a clip-style mount 122. In other embodiments, the camera housing 100 can be secured to a different type of mounting structure.

The described housing 100 may also be adapted for a wider range of devices of varying shapes, sizes and dimensions besides cameras. For example, an expansion module may be attached to housing 100 to add expanded features to electronic devices such as cell phones, music players, PDAs, GPS units, or other portable electronic devices.

Figure 3:
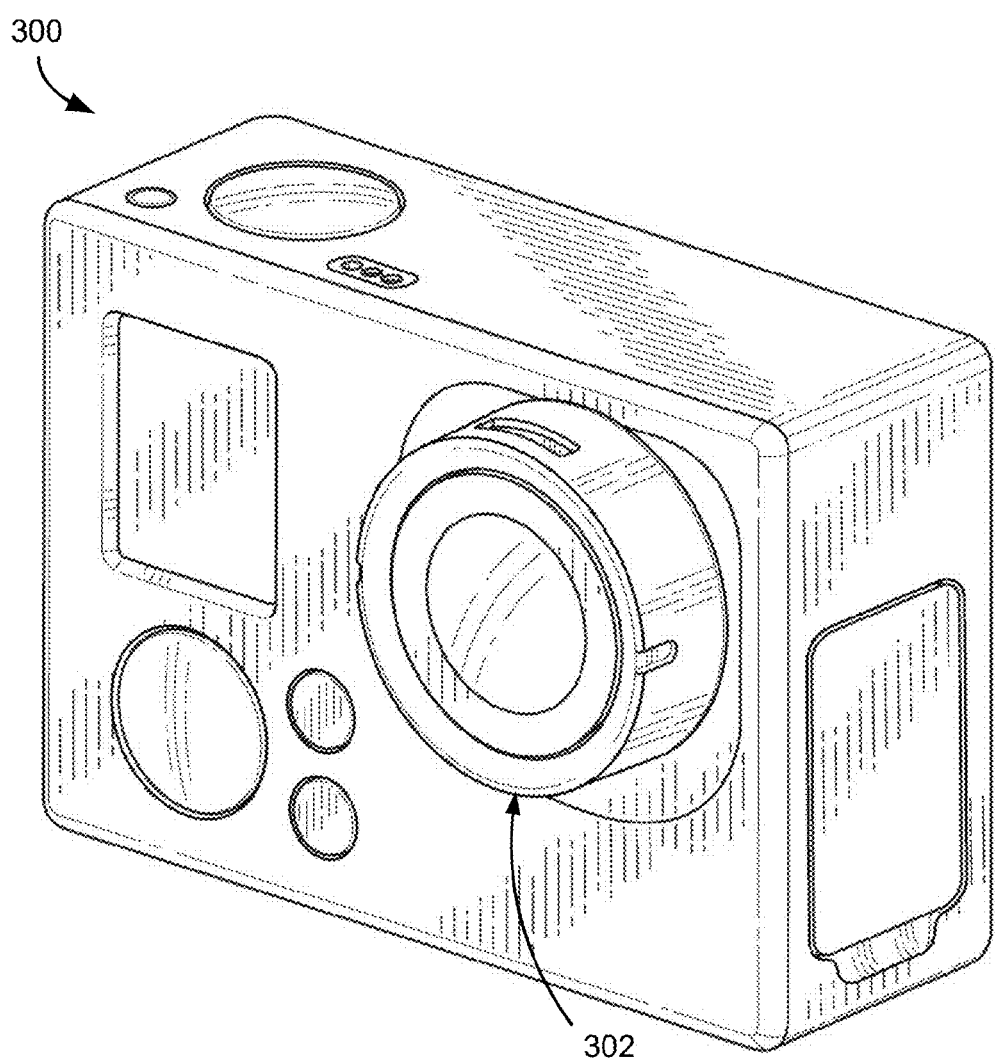
FIG. 3 illustrates a camera for use with the camera system, according to one embodiment.

FIG. 3 illustrates an example embodiment of a camera 300 for use with the camera system. The camera 300 is adapted to fit within the enclosure of the housing 100 discussed above. As shown in FIG. 3, a camera lens 302 is disposed on a front face of the camera 300. The camera 300 also comprises electronics that capture digital images and/or video via the camera lens 302. During operation of the camera 300, a portion of the electrical energy used by the electronics is converted to heat due to resistive components of the electronics. This heat can cause performance problems or damage to the electronics. Furthermore, if the housing 100 is waterproof, the housing 100 may insulate the camera 300 and prevent dissipation of the heat.

Camera System with Back-Side Heat Sink

To dissipate heat produced by the electronics of the camera 300, a heat sink is thermally coupled to the electronics of the camera and exposed on an exterior of the camera. In one embodiment, a heat sink is coupled to a back face of a camera (that is, on the face opposite to the camera lens). In other embodiments, thermally conductive elements may be disposed at different positions on the camera 300.

Figure 4A:
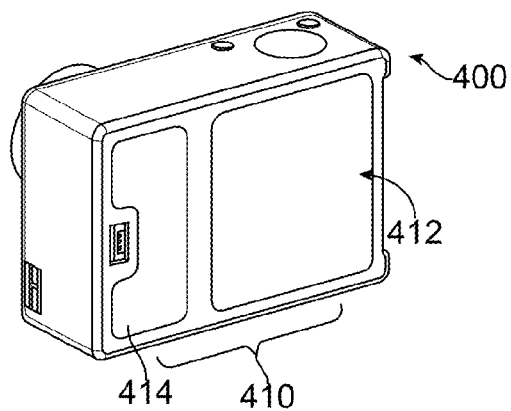
FIG. 4A illustrates a camera with a heat sink on a back face of the camera, according to one embodiment.

FIG. 4A illustrates a camera 400 with a heat sink 410 exposed on a back face of the camera 400, according to one embodiment. Embodiments of the camera 400 may be similar to the camera 300 described with respect to FIG. 3. In the embodiment of FIG. 4A, the heat sink 410 is coupled to heat-producing components within the camera 400, forming a thermally conductive path from the heat-producing components to the back face of the camera 400. The heat sink 410 comprises a thermally conductive material. In one embodiment, the thermal conductivity of the heat sink 410 is higher than the thermal conductivity of the camera 400. As illustrated in the embodiment of FIG. 4A, the heat sink 410 includes a planar component that is substantially flush with the back face of the camera 400.

Generally, the heat sink 410 increases an effective surface area from which heat is transferred away from the electronics of the camera 400. For example, in one embodiment, the heat sink 410 comprises a conductive structure thermally coupled to the electronics within the camera 400. The internal heat sink structure is coupled to a portion of the heat sink 410 exposed on a portion of the exterior of the camera 400, providing a conduction path to the exterior of the camera 400. During operation of the camera 400, heat produced by the electronics is therefore dissipated to the heat sink 410 and conductively transferred to the exterior of the camera 400, where it may be further dissipated to the surrounding environment (e.g., air or water) by conduction and/or convection. By dissipating heat produced by the electronics, the heat sink 410 improves thermal regulation of the electronics of the camera 400.

Figure 4B:
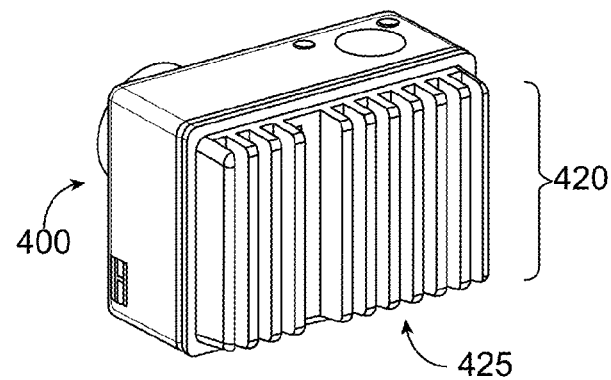
FIG. 4B illustrates a removable heat sink attached to a back face of a camera, according to one embodiment.

FIG. 4B illustrates a removable heat sink 420 configured to detachably couple to the back face of the camera 400, according to one embodiment. The removable heat sink 420 (a "heatsink backpac"), made of a thermally conductive material, couples to the heat sink 410. When the removable heat sink 420 is in contact with the heat sink 410 on the camera 400, conductive heat transfer may occur between the heat sink 410 and the removable heat sink 420. The removable heat sink thereby further dissipates heat from the heat sink 410 to the external environment. The removable heat sink 420 can be used, for example, in high-power modes or other camera modes in which extra heat dissipation is desired. The removability of the heat sink 420 is convenient because the user may prefer to operate the camera in the configuration of FIG. 4A (without any removable module) when the detachable heat sink 420 is not needed to reduce the size and weight of the camera. Furthermore, when the removable heat sink 420 is not needed, the user may attach other types of removable modules in its place (e.g., a removable LCD screen, removable expansion battery, removable wireless module, etc.).

In one embodiment, the removable heat sink 420 includes a plurality of fins 425 to increase the surface area of the removable heat sink 420, thereby increasing a rate of heat transfer from the removable heat sink 420. Although the fins 425 are configured in a vertical orientation in FIG. 4B, in other embodiments the removable heat sink 420 includes fewer or more fins that may be arranged in different configurations (e.g., horizontal or diagonal). Furthermore, while the fins 425 are shown in FIG. 4B has having a substantially rectangular cross-section, the fins 425 may be shaped differently in other embodiments.

Figure 4C:
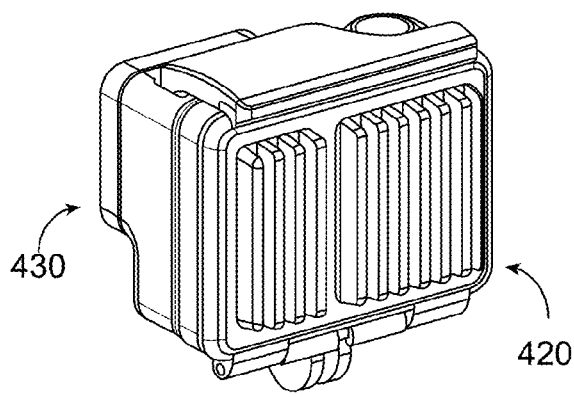
FIG. 4C illustrates a camera housing and a removable heat sink attached to a back face of a camera, according to one embodiment.

FIG. 4C illustrates a housing 430 for use with the camera 400 when the removable heat sink 420 is coupled to a back face of the camera 400, according to one embodiment. In one embodiment, the housing 430 forms a watertight seal around the perimeter of the heat sink 420 so that the housing 430 is waterproof, while enabling the fins 425 to protrude through one or more cutouts in the housing 430 so that they are exposed to the external environment. Other types of housings, as described above, for example, may also be configured for use with the camera 400, heat sink 410, and removable heat sink 420.

Figure 4D:
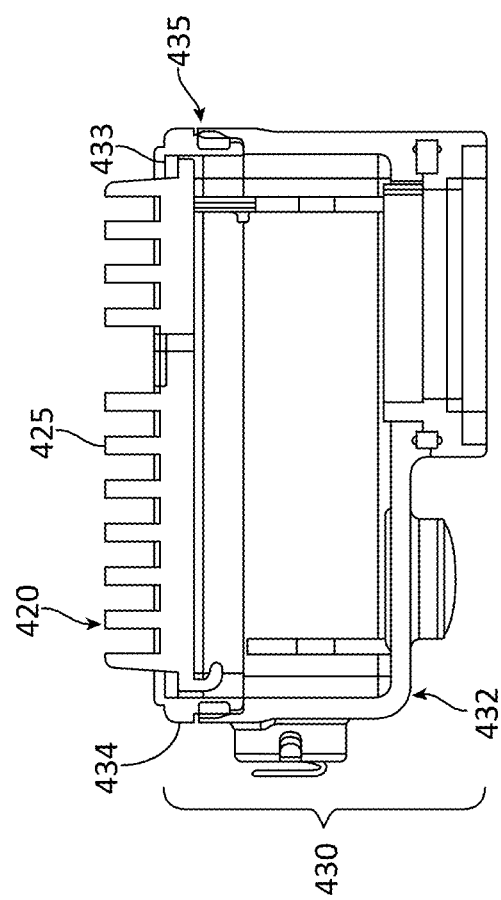
FIG. 4D illustrates a cross-sectional view of a housing and removable heat sink, according to one embodiment.

FIG. 4D illustrates a cross-sectional view of the housing 430 and removable heat sink 420, according to one embodiment. The housing 430 includes a front housing portion 432 and a back housing portion 434. In one embodiment, the back housing portion 434 detachably couples with the front housing portion 432 opposite the front face of the front housing portion 432. The front housing portion 432 and back housing portion 434 are collectively structured to enclose a camera when the back housing portion 434 is secured to the front housing portion 432 in a closed position. In various embodiments, fastening structures for securing the back housing portion 434 to the front housing portion 432 include an L-shaped bar attached to the back housing portion 434 and structured to couple with a hook-shaped lateral bar attached to the front housing portion 432, a button assembly, a buckle assembly, a clip assembly, a hook and loop assembly, a magnet assembly, a ball and catch assembly, an adhesive assembly, or any other type of securing mechanism.

A seal 433 forms a watertight seal between the back housing portion 434 and the removable heat sink 420. In one embodiment, the seal 433 comprises a compressible material. The seal 435 forms a watertight seal between the back housing portion 434 and the front housing portion 432 and furthermore serves to compress the removable heat sink 420 against the back of the camera 400. The seal 435 may comprise a latch, a compressible material, or another sealing structure for forming a watertight seal.

As shown in FIG. 4D, one embodiment of the back housing portion 434 is structured to enable the fins 425 of the removable heat sink 420 to protrude through a back face of the back housing portion 434. Other embodiments of the back housing portion 434 may enable different portions of the removable heat sink 420 to protrude through the back face. In still other embodiments, the removable heat sink 420 is substantially flush with the back face of the back housing portion 434.

Figure 5:
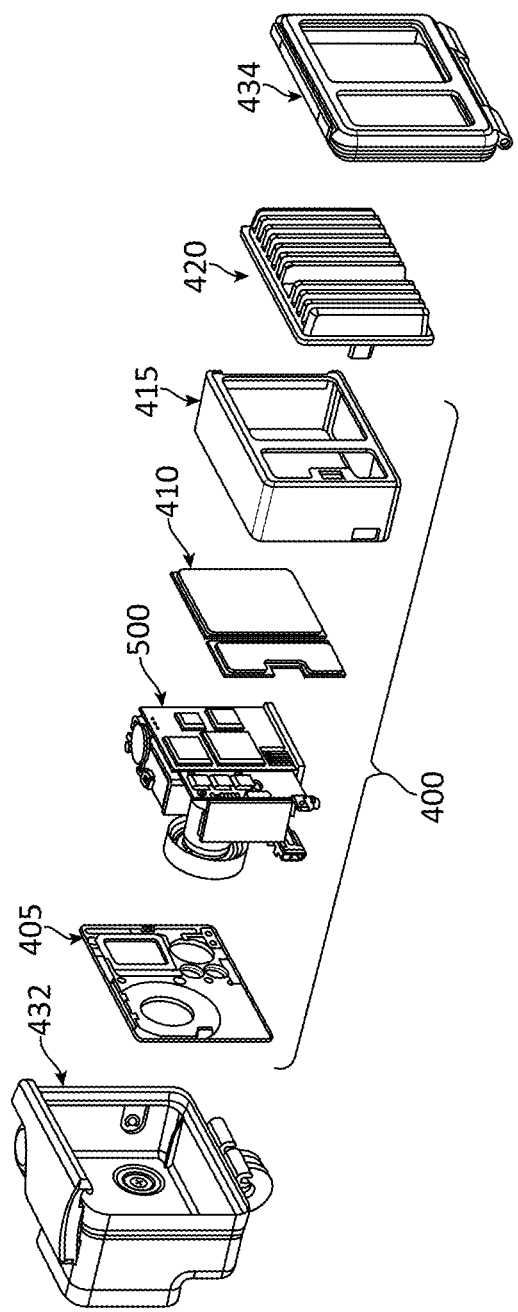
FIG. 5 is an exploded view of a camera system, according to one embodiment.

FIG. 5 illustrates an exploded view of the camera system of FIGS. 4C-D, according to one embodiment. The heat sink 410 is configured to thermally couple to a printed circuit board (PCB) 500 of the camera 400, which includes electronic components such as an image sensor, digital signal processor, and a network communication (e.g., WiFi) chip. The front portion of the camera 405 and back portion 415 of the camera substantially enclose the PCB 500 and heat sink 410 to form the camera 400, with portions of heat sink 410 exposed through openings in the back portion 415 of the camera 400. The removable heat sink 420 couples to the camera 400 to form a thermal conduction path from the PCB 500, through the heat sink 410, to the removable heat sink 420. The front housing portion 432 and rear housing portion 434 couple to form a housing 430 that is configured to receive the camera 400, which is removable from the housing 430. In one embodiment, the rear housing portion 434 detachably couples to the front housing portion 432 to enclose the camera 400 within the housing. The fins of removable housing portion 420 are configured to protrude through openings of the back housing portion 434 to expose the removable heat sink 420 to the external environment. In one embodiment, the removable heat sink 420, front housing portion 432, and rear housing portion housing 434 collectively form a watertight seal to prevent water from reaching the camera 400.

Figure 6:
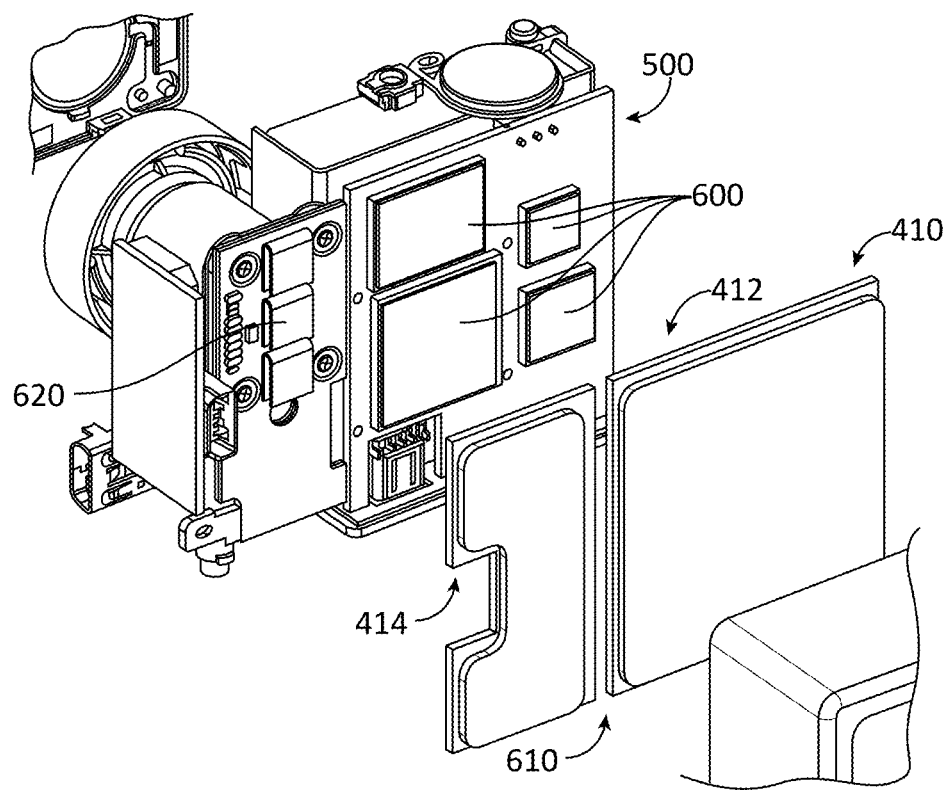
FIG. 6 illustrates an internal layout of a camera, according to one embodiment.

FIG. 6 is a detailed view of an internal layout of the camera 400 and heat sink 410, according to one embodiment. In one embodiment, the PCB 500 includes an image sensor (not shown) for capturing image data and various components 600 for image processing, data storage and output, and other functions of the camera 400 which may include, for example, a digital signal processor, a wireless interface, memory, and audio input hardware. The heat sink 410 thermally couples to the image sensor and the processing components 600, for example, via physical contact between the heat sink 410 and components 600. In one embodiment, thermal paste or a thermal pad is placed between the processing components 600 and the heat sink 410 to ensure thermal coupling and to improve the efficiency of heat transfer between the components 600 and the heat sink 410. Because the components 600 may have varying heights extending from the face of the PCB 500, one embodiment of the heat sink 410 includes notches configured to receive the components 600 and provide uniform spacing between the heat sink 410 and each of the components 600.

In one embodiment, the heat sink 410 is thermally coupled to the image sensor by flexible spacers 620 made of a thermally conductive material (e.g., graphene). The spacers 620 are flexible, heat-conducting components that provide a thermal conduction path between the image sensor and the heat sink 410. The spacers 620 are flexible so as to provide variable distance between the heat sink 410 and the PCB 500, ensuring thermal coupling between the image sensor and heat sink 410 while compensating for potentially varying sizes of the camera 400 and heat sink 410 resulting from manufacturing tolerances. Moreover, the flexibility of the spacers 620 protects the lens of the camera 400 from mechanical shock. In other embodiments, the image sensor is thermally coupled to the heat sink 410 by other mechanisms, such as a thermal pad.

In one embodiment, the heat sink 410 comprises two plates 412 and 414 separated by a gap 610. The plate 412 couples to the processing components 600 of PCB 500, and the plate 414 couples to the image sensor. The gap 610 in the heat sink 410 thermally isolates the image sensor from the high heat-producing processing components 600 so that heat from the processing components 600 does not overheat the image sensor or vice versa. In an alternative embodiment, the plates 412 and 414 of the heat sink 410 are connected by a thin piece of metal (relative to the thickness of the plates), or connected by a thermal insulator. As illustrated in FIG. 13, the size and location of the gap 610 relative to the plates 412 and 414 can be adjusted to accommodate variations in the camera 400 and/or the PCB 500. In an alternative embodiment, a single plate may be used as heat sink 410 or the heat sink 410 may have a different non-planar configuration.

In one embodiment, the heat sink 410 comprises a graphene layer coupled to a metal plate, such that the graphene layer is between the metal plate and the heat-producing components 600 of the PCB 500. In another embodiment, the heat sink 410 comprises a graphene layer laminated between two metal layers. Due to its high thermal conductivity, the graphene layer efficiently spreads heat produced by the processing components 600 across the heat sink 410 to reduce the thermal gradient across the face of the heat sink 410. In other embodiments, the heat sink 410 is made of other thermally conductive materials.

Figure 7A:
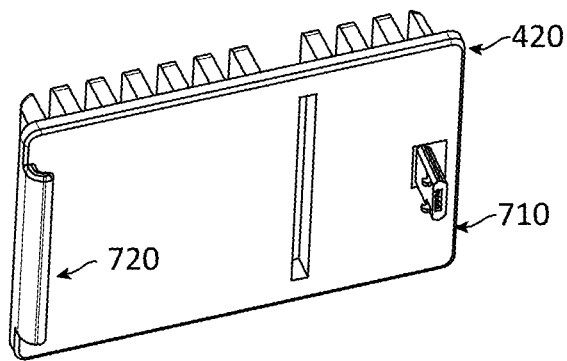
FIG. 7A illustrates a perspective view of a removable heat sink, according to one embodiment.

FIG. 7A is a perspective view of an embodiment of the removable heat sink 420. The removable heat sink 420 couples to the camera 400 by a latching mechanism configured to provide firm physical contact between the removable heat sink 420 and the heat sink 410 of the camera 400 when the removable heat sink 420 is attached to the camera. For example, in one embodiment, the removable heat sink 420 includes a J-hook connector 720 on one side that couples to a reciprocal opening on the corresponding back face of the camera 400. The J-hook connector 720 allows the removable heat sink 420 to pivot about the connector and swing closed, where it can be locked into place by a connector on the other side of the back face of the camera 400. This connection method allows the removable heat sink 420 to be pulled close together with the back face of the camera 400, creating flush contact and enabling efficient heat conduction from the heat sink 410 to the removable heat sink 420.

In one embodiment, the removable heat sink 420 includes an electronic connector 710 (e.g., a microUSB connection or other serial or parallel interface) that has both the mechanical function of securing the removable heat sink 420 to the camera 400 and the electronic function of communicating to the camera 400 that the removable heat sink 420 is attached to the camera 400. When the removable heat sink 420 is coupled to the camera 400, the electronic connector 710 plugs into a reciprocal port on the camera 400. A processor of the camera 400 is configured to detect when the electronic connector 710 is plugged into the camera 400. Other communication mechanisms or sensors may be used instead of the electronic connector 710. For example, the removable heat sink 420 or the camera 400 may include a magnetic, capacitive, inductive, or optical proximity sensor for signaling to the camera 400 that the removable heat sink 420 is attached to the camera 400. In one embodiment, the camera 400 operates in a first mode (such as a low-power mode or a low resource-intensive mode) when the camera 400 does not detect that the removable heat sink 420 is coupled to the camera 400, and operates in a second mode (such as a high-power mode or a high resource-intensive mode) when the camera 400 detects that the removable heat sink 420 is coupled to the camera 400. In other embodiments, the removable heat sink 420 may include other built-in electronics to add additional intelligent features to the camera 400 when connected.

Figure 7B:
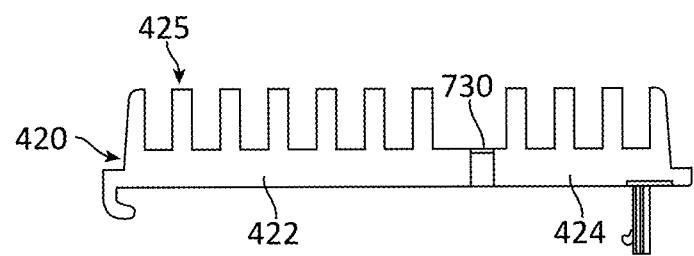
FIG. 7B illustrates a cross-section of a removable heat sink, according to one embodiment.

FIG. 7B is a cross-section of the removable heat sink 420, illustrating the fins 425. As described above with respect to other embodiments of a camera heat sink, the fins 425 beneficially allow for heat transferred from the camera to the removable heat sink 420 to be dissipated more easily than a heat sink with a flat front face. The fins increase the surface area of the heat sink for heat transfer to the surrounding environment, and create wind resistance that further improves heat dissipation from the fins. As shown in FIG. 7B, two portions 422 and 424 of the removable heat sink 420 may be thermally separated by an air gap but mechanically coupled by the metal connector 730. For example, the portion 422 may be configured to couple to the plate 412 of the heat sink 410, while the portion 424 may be configured to couple to the plate 414 of the heat sink 410. The metal connector 730 between the portions 422 and 424 has a small cross-sectional area relative to the removable heat sink 420, reducing heat transfer between the portions 422 and 424 and improving thermal isolation between different respective electronic components of the camera 400 (e.g., between the image sensor and processing components). In another embodiment, the metal connector 730 may include a plastic strip co-molded in the metal to further decrease heat transfer between the portions 422 and 424.

Figure 8A:
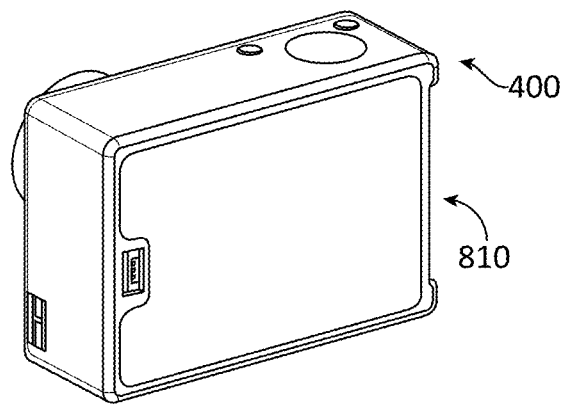
FIG. 8A illustrates an insulating cover coupled to a camera for covering a heat sink on a back face of the camera, according to one embodiment.

As described above, the heat sink 410 is exposed on an external face of the camera 400. The heat sink 410 may become hot during operation of the camera 400. In one embodiment, to protect a user of the camera 400 from incidental contact with the heat sink 410 when the camera 400 is used without the removable heat sink 420, the camera 400 comprises a removable cover structured to attach to the camera 400 and cover the heat sink 410. FIG. 8A illustrates a removable cover 810 attached to the camera 400 for covering the heat sink 410, according to one embodiment. When the camera 400 is operated in a low-power mode, the heat sink 410 may dissipate enough heat from the processing components 600 to prevent damage to the components 600, without requiring the removable heat sink 420. When operated in low-power modes (or other low heat-producing modes), the cover 810 can be attached to the camera 400. The cover 810 is made of a thermally insulating material, and is configured to prevent a user of the camera 400 from incidental contact with the heat sink 410. The cover 810 may form a substantially smooth surface over the back face of the camera 400 when attached. Although the cover 810 reduces heat dissipation from heat sink 410 to the external environment, the heat sink 410 under the cover 810 spreads heat generated by the electronic components, which may provide sufficient heat dissipation to cool the electronic components for low-power camera modes.

Figure 8B:
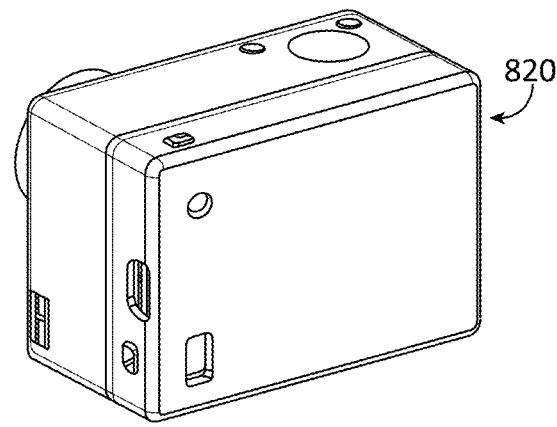
FIG. 8B illustrates an expansion module attached to a camera, according to one embodiment.

In one embodiment, the cover 810 is a removable cover that snaps into or otherwise attaches to the camera 400, but can be removed to expose the heat sink 410. As illustrated in FIG. 8B, the cover 810 may be relatively thin so as to allow an additional module 820 to be attached to the back of the camera 400 and add expanded features to the camera 400. In this embodiment, the cover 810 furthermore functions to reduce heat transfer between the heat sink 410 and the module 820 when the module 820 is attached to the camera 400. When the camera 400 is operated in a high heat-producing mode, the user removes the cover 810 to expose the heat sink 410 and attaches the removable heat sink 420 to the camera 400 (as illustrated, for example, in FIG. 4B).

Figure 9A:
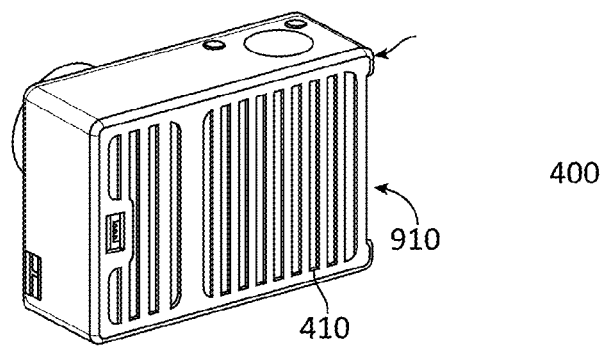
FIG. 9A illustrates a cover integrated with a back face of a camera for covering a heat sink, according to one embodiment.

In another embodiment, the back of the camera 400 includes a slotted cover 910 as illustrated in FIG. 9A. This cover 910 may be removable like the cover 810, or may be fixedly structured as part of the camera 400. FIG. 9A illustrates a slotted cover 910 attached to the back face of the camera 400 for covering the heat sink 410, according to one embodiment. The slotted cover 910 includes a grating that allows complementary structures on the removable heat sink 420 to contact the heat sink 410 coupled to the camera 400, while reducing the likelihood of incidental contact between the user of the camera 400 and the heat sink 410 when the removable heat sink 420 is not attached. In other embodiments, the slotted cover 910 includes holes or a grating arranged in a different configuration than that shown in FIG. 9A (such as a horizontal configuration). When the camera 400 is operated in a low heat mode, the camera 400 can be used as shown in FIG. 9A or an additional module (such as the module 820) can be attached to the back of the camera 400.

Figure 9B:
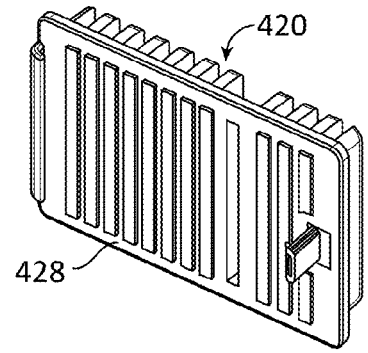
FIG. 9B illustrates a removable heat sink comprising ridges for contacting a heat sink on a back face of a camera through an integrated cover, according to one embodiment.
Figure 9C:
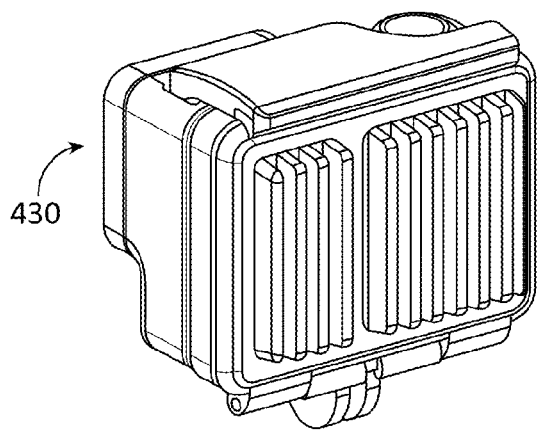
FIG. 9C illustrates a housing and a removable heat sink attached to a back face of a camera, according to one embodiment.

FIG. 9B illustrates an embodiment of the removable heat sink 420 comprising a series of ridges 428 configured to fit through the grating or holes in the slotted cover 910 to contact the heat sink 410. To operate the camera 400 in a high heat mode, a user can attach the removable heat sink 420 illustrated in FIG. 9B to the camera 400. When the removable heat sink 420 is attached to the camera 400, the ridges 428 form a thermal conduction path from the heat sink 410 to the removable heat sink 420. The camera 400 with removable heat sink 420 attached can be optionally enclosed in the housing 430 (e.g., a waterproof housing) with the fins protruding through openings in the back of the housing 430, as illustrated in FIG. 9C.

Figure 10:
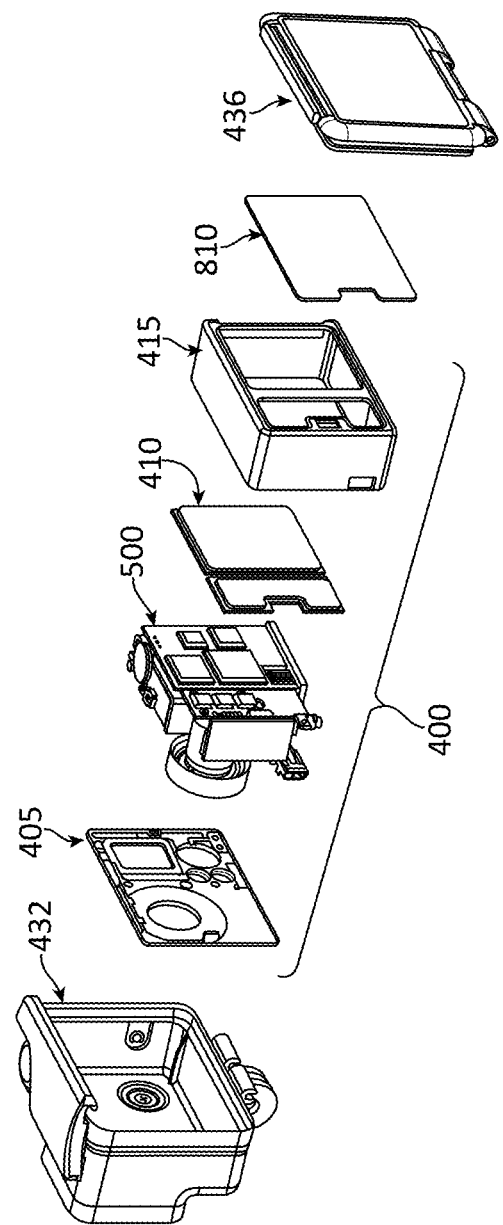
FIG. 10 is an exploded view of a camera system for operating in a low-heat mode, according to one embodiment.

FIG. 10 is an exploded view of a camera system including the cover 810 coupled to the heat sink 410 for operating the camera 400 in a low-heat mode, according to one embodiment. As discussed above, the heat sink 410 is coupled to the PCB 500 of the camera 400. The front portion of the camera 405 and back portion 415 of the camera substantially enclose the PCB 500 and heat sink 410 to form the camera 400, with portions of heat sink 410 exposed through openings in the back portion 415 of the camera 400. The cover 810 is removably coupled to the back portion 415 of the camera 400 to reduce heat transfer from the heat sink 410 to the back housing portion 436 or a user of the camera 400. The front housing portion 432 and back housing portion 436 collectively form a housing configured to receive the camera 400. In one embodiment, the back housing portion 436 detachably couples to the front housing portion 432 for enclosing the camera 400 within the housing. As can be seen, in one embodiment, the back portion of the housing 436 does not have any cutouts since the removable heat sink 420 is not used in this configuration.

When the camera 400 is operated in a high-power mode, the removable heat sink 420 can be attached to the camera 400 to increase heat dissipation from the PCB 500 as shown, for example, in FIG. 5. In embodiments including a removable cover 810, the cover 810 can be removed prior to the removable heat sink 420 being attached to the camera 400. In this case, the heat sink 410 forms a planar surface substantially flush with the back surface of the camera 400, and the removable heat sink 420 comprises a planar surface structured to make contact with the heat sink 410.

Figure 11:
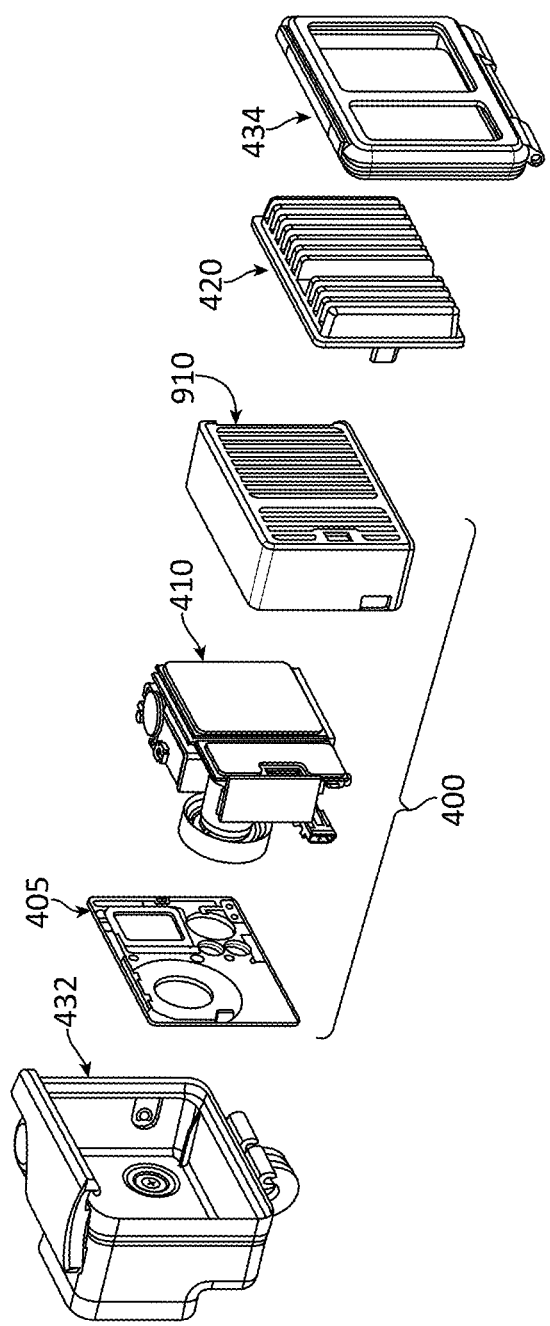
FIG. 11 is an exploded view of a camera system including a removable heat sink coupled to a camera for operating in the camera in a high-heat mode, according to one embodiment.

Alternatively, in embodiments of the camera 400 comprising a slotted cover 910, the camera 400 may operate in a low-power mode when the removable heat sink 420 is not attached. To operate the camera 400 in a high-power mode, the user attaches the removable heat sink 420 to the camera 400. FIG. 11 is an exploded view of a camera system including the removable heat sink 420 coupled to the camera 400 for operating the camera 400 in a high-heat mode, according to one embodiment. The embodiment of FIG. 11 includes a slotted cover 910 on the back face of the camera 400, which couples to the front portion 405 to form the camera 400. In this case, the heat sink 410 is recessed below the surface of the camera 400. The removable heat sink 420 can be attached to the camera 400 to operate in a high-heat mode. When the removable heat sink 420 is attached to the camera 400, the ridges 428 of the removable heat sink 420 (not visible in FIG. 11) extend through the grating of the slotted cover 910 to contact the heat sink 410. The camera 400 and removable heat sink 420 may be enclosed in a housing with front portion 432 and back portion 434 such that the fins of the removable heat sink 420 protrude through the back housing portion 434.

In another embodiment of the camera 400, a heat sink is fixed to the camera 400. FIGS. 12A-B illustrate a heat sink 1210, which is not intended to be removed by the user, fixed to the back face of the camera 400. Embodiments of the fixed heat sink 1210 may be similar to the heat sink 410 described above. For example, the fixed heat sink 1210 is structured to thermally couple to the electronic components of the camera 400, and comprises a thermally conductive material. In one embodiment, the fixed heat sink 1210 includes a plurality of fins 1215 protruding from the back face of the heat sink 1210 and running from the top to the bottom of the heat sink 1210. As described above, the fins 1215 increase the rate of heat transfer from the camera 400. In other embodiments, the heat sink 1210 includes fewer or more fins that may be arranged in differing configurations than that illustrated in FIG. 12A. For example, in other embodiments, the heat sink 1210 forms a planar surface.

FIG. 12B illustrates a housing 1220 surrounding the camera 400 and heat sink 1210, according to one embodiment. In one embodiment, the housing 1220 forms a watertight seal around the heat sink 1210 so that the housing 1220 is waterproof. Other types of housings, as for example described above, may also be configured for use with the camera 400 and heat sink 1210.

FIG. 13 is an exploded view of a camera system including a heat sink 1210 integrated with the back face of the camera 400, according to one embodiment. The heat sink 1210 couples to the front camera portion 405 to form the camera 400, and makes contact with the PCB 500 when attached to the front camera portion 405. In one embodiment, thermal paste, a thermal pad, or other conductive material interfaces between the electronic components on the PCB 500 and the heat sink 1210 to ensure thermal coupling. The front housing portion 1222 receives the camera 400, and the back housing portion 1224 detachably couples to the front housing portion 1222 to enclose the camera (coupled to the heat sink 1210) within the housing.

In other embodiments, a heat sink can be integrated with a back housing portion of a camera housing. As shown in FIG. 14A, the heat sink 410 is exposed on the back face of the camera 400. FIG. 14B illustrates a back housing portion 1410 including a heat sink 1415 integrated with the back housing portion 1410. The back housing portion 1410 detachably couples to the front housing portion 432 to enclose the camera 400 within the housing. When the back housing portion 1410 is coupled to the front housing portion 432, the heat sink 1415 thermally couples to the heat sink 410 on the camera 400. In one embodiment, the heat sink 1415 includes an electronic connector 1417 (e.g., a microUSB connection or other serial or parallel interface) that has both the mechanical function of securing the back housing portion 1410 to the camera 400 and the electronic function of communicating to the camera 400 that the back housing portion 1410 and heat sink 1415 are attached to the camera 400. In one embodiment, the heat sink 1415 includes a plurality of fins similar to the fins 425 or 1215 described above. In another embodiment, the heat sink 1415 forms a substantially flat surface on the back face of the back housing portion 1410.

FIG. 15 illustrates a cross-sectional view of the housing 430 with back housing portion 1410, according to one embodiment. The heat sink 1415 is permanently coupled to the back housing portion 1410 by a seal 1412. In one embodiment, the seal 1412 comprises a bonding tape, such as VHB™, although other methods for bonding the heat sink 1415 to the back housing portion 1410 may be used instead of or in addition to the bonding tape. In one embodiment, fins of the heat sink 1415 protrude through cutouts in the back housing portion 1410. The back housing portion 1410 detachably couples to the front housing portion 432 to enclose the camera 400 within the housing 430. In one embodiment, a seal 1414 forms a watertight seal between the back housing portion 1410 and the front housing portion 432. The seal 1414 may comprise a latch, a compressible material, or another sealing structure for forming a watertight seal.

FIG. 16 is an exploded view of a camera system including the heat sink 1415 integrated with the back housing portion 1410, according to one embodiment. The front portion of the camera 405 and back portion 415 of the camera substantially enclose the PCB 500 (not shown in FIG. 16) and heat sink 410 to form the camera 400, with portions of heat sink 410 exposed through openings in the back portion 415 of the camera 400. The front housing portion 432 receives the camera 400, and the back housing portion 1410 detachably couples to the front housing portion 432 to enclose the camera 400 within the housing. When the camera 400 is enclosed in the housing, the heat sink 1415 thermally couples to the heat sink 410 (coupled to the PCB of the camera 400), forming a thermal conduction path from the PCB 500 to the external environment.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:
1. A camera system, comprising:
a camera body having a camera lens structured on a front surface of the camera body;
electronics internal to the camera body, the electronics for capturing images via the camera lens, the electronics including at least a first subset of the electronics and a second subset of the electronics;
a thermally conductive material thermally coupled to the electronics and exposed on a back face of the camera body, the thermally conductive material to transfer heat produced by the electronics to the back face of the camera body, wherein the thermally conductive material comprises a first plate and a second plate, the first plate structured to thermally couple to the first subset of the electronics and the second plate structured to thermally couple to the second subset of the electronics; and
a housing comprising a front portion and a back portion, the front portion structured to receive the camera body and the back portion structured to couple to the front portion to at least partially enclose the camera body, the back portion comprising a heat sink structured to contact the thermally conductive material when the camera body is enclosed within the housing, the heat sink providing a thermal conduction path from the thermally conductive material to an exterior of the housing.
2. The camera system of claim 1, wherein the back portion of the housing is detachable from the front portion of the housing.

3. The camera system of claim 1, wherein the back portion of the housing forms a watertight seal around the camera body.

4. The camera system of claim 1, wherein the first plate and the second plate are separated by a gap.

5. The camera system of claim 1, wherein the first plate and the second plate are coupled by a material having a lower thermal conductivity than the first plate and the second plate.

6. The camera system of claim 1, wherein the heat sink comprises:
   a first heat sink portion to contact the first plate when the camera body is enclosed within the housing;
   a second heat sink portion to contact the second plate when the camera body is enclosed within the housing; and
   a connector having a smaller cross-sectional area than the first heat sink portion and the second heat sink portion.

7. The camera system of claim 1, wherein at least one of the first plate and the second plate comprises a planar component substantially flush with the external face of the camera body.

8. The camera system of claim 1, further comprising:
   one or more flexible spacers between the thermally conductive material and the electronics, the flexible spacers providing a thermal conduction path from the electronics to the thermally conductive material.

9. The camera system of claim 1, wherein the heat sink comprises a plurality of fins structured to protrude from a surface of the heat sink.

10. The camera system of claim 1, wherein the electronics comprises a processor adapted to detect the heat sink is in contact with the thermally conductive material, and wherein the processor is adapted to operate the camera in a first mode responsive to detecting the heat sink is not in contact with the thermally conductive material and to operate the camera in a second mode responsive to detecting the heat sink is in contact with the thermally conductive material.

11. The camera system of claim 1, wherein the camera body comprises a grated face covering a portion of the thermally conductive material.

12. A camera system, comprising:
   a camera body having a camera lens structured on a front surface of the camera body, wherein the camera body comprises a grated face;
   electronics internal to the camera body, the electronics for capturing images via the camera lens;
   a thermally conductive material thermally coupled to the electronics and exposed on a back face of the camera body, the thermally conductive material to transfer heat produced by the electronics to the back face of the camera body, the thermally conductive material at least partially covered by the grated face; and
   a housing comprising a front portion and a back portion, the front portion structured to receive the camera body and the back portion structured to couple to the front portion to at least partially enclose the camera body, the back portion comprising a heat sink structured to contact the thermally conductive material when the camera body is enclosed within the housing, the heat sink providing a thermal conduction path from the thermally conductive material to an exterior of the housing, wherein the heat sink comprises ridges complementary to the grated face and structured to extend through the grated face to contact the thermally conductive material.

13. The camera system of claim 12, wherein the back portion of the housing is detachable from the front portion of the housing.

14. The camera system of claim 12, wherein the back portion of the housing forms a watertight seal around the camera body.

15. The camera system of claim 12, wherein the heat sink comprises a plurality of fins structured to protrude from a surface of the heat sink.

16. A camera housing, comprising:
   a front portion comprising a top side, bottom side, left side, and right side forming a cavity structured to receive a camera;
   and a back portion structured to couple to the front portion to at least partially enclose the camera body, the back portion comprising a heat sink having an inner portion internal to the camera housing structured to contact a thermally conductive material of a camera when the camera is enclosed within the housing, and the back portion comprising an outer portion on an outer surface of the camera housing, the outer portion of the heat sink thermally coupled to the inner portion the heat sink, the heat sink providing a thermal conduction path from the thermally conductive material of the camera to an exterior of the housing, wherein the heat sink comprises:
      a first heat sink portion to contact a first plate of the thermally conductive material of the camera when the camera is enclosed within the housing;
      a second heat sink portion to contact a second plate of the thermally conductive material of the camera when the camera is enclosed within the housing; and
      a connector having a smaller cross-sectional area than the first heat sink portion and the second heat sink portion.

17. The camera housing of claim 16, wherein the heat sink comprises a plurality of fins structured to protrude from a surface of the heat sink.

18. The camera housing of claim 16, wherein the camera body comprises a grated face covering a portion of the thermally conductive material.

19. The camera housing of claim 16, wherein the removable heat sink comprises ridges complementary to a grated face on the camera, the ridges structured to extend through the grated face to contact the thermally conductive material of the camera.

20. The camera housing of claim 16, wherein the housing is structured to form a watertight seal around the heat sink.

* * * * *